United States Patent [19]

Nomura et al.

[11] Patent Number: 5,011,873
[45] Date of Patent: Apr. 30, 1991

[54] MOLDING POLYAMIDE RESIN COMPOSITION

[75] Inventors: Isao Nomura, Hiratsuka; Kazuo Yamamiya, Chigasaki, both of Japan

[73] Assignee: Mitsubishi Gas Chemical Company, Inc., Tokyo, Japan

[21] Appl. No.: 425,980

[22] Filed: Oct. 24, 1989

[51] Int. Cl.$^5$ .............................................. C08K 7/14
[52] U.S. Cl. ...................................... 523/466; 524/538
[58] Field of Search ......................... 523/466; 524/538; 525/423, 428, 429, 432

[56] References Cited

U.S. PATENT DOCUMENTS 4,822,846  4/1989  Nomura et al. ...................... 524/538
4,866,115  9/1989  Betz et al. ............................ 524/538

FOREIGN PATENT DOCUMENTS 0337443 10/1989 European Pat. Off. .

OTHER PUBLICATIONS

Chemical Abstracts, vol. 108, No. 10, 7th Mar. 1988, p. 48, Abstract No. 76543y, Columbus, Ohio, US; & JP-A-62 223 261 (Mitsubishi Gas Chemical Co., Ltd.) 01-10-1987.
Chemical Abstracts, vol. 112, No. 16, 16th Apr. 1990, p. 59, Abstract No. 140645v, Columbus, Oh., US; & JP-A-01 272 662 (Mitsubishi Gas Chemical Co., Ltd.) 31-10-1989.

Primary Examiner—Lewis T. Jacobs
Attorney, Agent, or Firm—Wenderoth, Lind & Ponack

[57] ABSTRACT

A molding polyamide resin composition comprising
(A) 50 to 99 parts by weight of a polyamide resin derived from xylylenediamine as a main diamine component and an alpha,omega-straight chain aliphatic dicarboxylic acid as a main dicarboxylic acid component,
(B) 1 to 50 parts by weight of polyhexamethyleneadipamide resin,
(C) 5 to 85 parts by weight, per 100 parts by weight of components (A) and (B) combined, of a thermosetting resin power having an average particle diameter of 1 to 800 micrometers, and
(D) 5 to 200 parts by weight, per 100 parts by weight of components (A) and (B) combined, of glass fibers, the total amount of the polyamide resin components (A) and (B) being 100 parts by weight.

8 Claims, No Drawings

MOLDING POLYAMIDE RESIN COMPOSITION

This invention relats to a molding polyamide resin composition. More specifically, it relates to a molding polyamide resin composition which has excellent strength at high temperatures, heat aging resistance, mechanical properties, electrical properties and dimensional stability and low water absorption.

A polyamide resin obtained from xylylenediamine and an alpha,omega-straight chain aliphatic dicarboxylic acid (to be abbreviated as "MX nylon") is used as a molding material for various articles because of its excellent mechanical properties, electrical properties, dimensional stability and chemical resistance and low water imbibition. These properties of MX nylon, however, are not sufficient and are unsuitable for practical purposes where it is used as a structural material requiring strength at high temperatures and heat aging resistance in automobile engine covers, silencers, connectors, etc.

Generally, the heating aging resistance of polyamide resins can be enhanced by, for example, adding an antioxidant of the phenol or phosphite type, and the strength at high temperatures of the polaymide resins can be increased by incorporating glass fibers or other inorganic fillers. The additives, however, cannot improve these properties of the MX nylon.

Japanese Laid-Open Patent Publications Nos. 141234/1983 and 152046/1983 disclose resin compositions comprising thermoplastic resins such as polyolefin resins, polystyrene resins, acrylic resins and polyamide resins and granular or powdery phenol-formaldehyde resins. These patent documents cite ordinary nylon 6 and nylon 66 as the polyamide resins, and disclose that by incoprorating granular or powdery phenol-formaldedhyde resins in these polyamide resins, their heat distortion temperature, volume inherent resistivity upon boiling and compression strength can be improved. A composition comprising an ordinary polyamide resin such as nylon 6 and nylon 66 and a powdery thermosetting resin lacks rigidity when used as a metal substitute, and the improvement of its rigidity is desired.

Heretofore, no practical method of improving the heat aging resistance and strength at high temperatures of a resin composition comprising MX nylon has been known.

It is an object of this invention to provide a novel molding polyamide resin composition.

Another object of this invention is to provide a molding polyamide resin composition having excellent strength at high temperatures, heat aging resistance and thermal resistance.

Other objects of this invention along with its advantages will become apparent from the following description.

In accordance with this invention, these objects and advantages of the invention are achieved by a molding polyamide resin composition comprising (A) 50 to 99 parts by weight of a polyamide resin derived from xylylenediamine as a main diamine component and an alpha,omega-straight chain aliphatic dicarboxylic acid as a main dicarboxylic acid component, (B) 1 to 50 parts by weight of polyhexamethyleneadipamide resin, (C) 5 to 85 parts by weight, per 100 parts by weight of components (A) and (B) combined, of a thermosetting resin powder having an average particle diameter of 1 to 800 micrometers, and (D) 5 to 200 parts by weight, per 100 parts by weight of components (A) and (B) combined, of glass fibers, the total amount of components (A) and (B) being 100 parts by weight.

The polyamide resins used in this invention are the polyamide resin (A) derived from a xylylenediamine as a main diamine component and an alpha,omega-straight chain aliphatic dicarboxylic acid as a main dicarboxylic acid component and the poly(hexamethylene adipamide) resin (B).

The polyamide resin (A) contains xylylenediamine as a main diamine component. The xylylenediamine may be m-xylylenediamine, p-xylylenediamine, or a mixture of both. Preferred as the xylyleneaimine are m-xylylenediamine and a mixture of p- and m-xylylenediamines containing not more than 40 % of p-xylylenediamine. Preferably, the xylylenediamine accounts for at least 85 mole %, especially at least 90 mole %, above all at least 95 mole %, of the entire diamine components.

Other diamines that can be used include, for example, tetramethylenediamine, octamethylenediamine, p-phenylenediamine, 1,3-bisaminomethylcyclohexane and isophoronediamine.

The dicarboxylic acid component of the polyamide resin (A) is composed mainly of the alpha,omega-straight chain aliphatic dicarboxylic acid. Preferably, the alpha,omega-straight chain aliphatic dicarboxylic acid has 6 to 18 carbon atoms. Examples include adipic acid, sebacic acid, suberic acid, undecanoic acid, dodecanedioic acid and eicosanedioic acid. Of these, adipic acid and sebacic acid are particularly preferred.

The amount of the alpha,omega-straight chain aliphatic dicarboxylic acid is preferably at least 85 mole %, more preferably at least 90 mole %, and especially preferably at least 95 mole %, of the entire dicarboxylic acid components.

The other polyamide resin (B) is poly(hexamethylene adipamide) resin (to be sometimes referred to as nylon 66). The nylon 66 can drastically shorten the molding cycle time of the MX nylon.

The polyamide resin (A) is used in an amount of 50 to 99 parts by weight, and the nylon 66 (B), in an amount of 1 to 50 parts by weight, provided that the total amount of the polyamide resins (A) and (B) is 100 parts by weight.

If the proportion of nylon 66 is less than 1 part by weight as against 99 parts by weight of the MX nylon, there is little effect on the improvement of the moldability of the MX nylon. If nylon 66 is added in an amount of more than 50 parts by weight per 50 parts by weight of MX nylon, the mechanical strength and rigidity of the resulting composition are degraded.

Preferably, 70 to 95 parts by weight of the polyamide resin (A) and 5 to 30 parts by weight of nylon 66 (B) are used to make up 100 parts by weight of the polyamide resins (A) and (B) combined.

Another component used in the composition of this invention is the thermosetting resin powder (C) having an average particle diameter of 1 to 800 micrometers.

Examples of the thermosetting resin are phenolic resins, xylene resins, melamine resins, epoxy resins, unsaturated polyester resin, urea resins, furan resins, and alkyd resins.

Preferred as these thermosetting resins are phenolic resins, xylene resins, melamine resins and epoxy resins. The phenolic resins and xylene resins are particularly preferred. The phenolic resins preferably contain methylol groups, particularly 0.5 to 10 % by weight of methylol groups.

The average particle diameter of the thermosetting resin powder used in this invention is 1 to 800 micrometers, preferably 1 to 100 micrometers, particularly preferably 5 to 50 micrometers.

If the average particle diameter of the thermosetting resin powder (C) is more than 800 micrometers, the moldability of the resulting composition is reduced.

The phenolic resin powder used in this invention may be produced by the methods described, for example, in Referential Example 2 of Japanese Laid-Opdn Patent Publication No.141234/1983.

The xylene resin may be produced, for example, by the following method. Phenol (200 g), 30 g of xylene resin powder (Nikanol H, a tradename for a product of Mitsubishi Gas Chemical Co., Inc.) and 0.1 g of p-toluene sulfonic acid dissolved in a small amount of methanol are introduced into a 1-liter separable flask equipped with a reflux condenser, a thermometer and a stirrer. The temperature is elevated to 100° C., and the reaction is carried out under reflux for 30 minutes. The reaction mixture is cooled to 60° C., and 190 g of formalin (37% aqueous soluion), 95 g of water, 4 g of 28 % aqueous ammonia, and 40 g of 10 % aqueous solution of gum arabic were added. The temperature is elevated to 87° C. over 40 minutes, and the reaction is carried out at 87° C. for 85 minutes. Then, the reaction mixture is cooled to 30° C. Water (500 cc) is added, and the mixture is filtered, and dried. As required, the product is sieved to obtain bead-like xylene phenol-resol resin having a particle diameter of 1 to 800 micrometers.

The melamine resin powder can be produced, for example, by the following procedure.

A 500 ml. round-bottomed flask equipped with a reflux condenser and a stirrer is charged with 10 g of melamine, 80 g of benzoguanamine, 170 g of 37 % formalin, 10 g of 25 % aqueous ammonia, 5 g of sodium fluoride, 10 g of calcium chloride and 70 g of water, and with stgirring, the materials are reacted at 80° C. for 90 minutes. After cooling, the reaction mixture is subjected to solid-liquid separation. The solid is washed and dried, and as required, sieved to form a non-tacky fine spherical resin powder.

The proportion of the thermosetting resin powder (C) used in this invention is 5 to 85 parts by weight, preferably 10 to 50 parts by weight, per 100 parts by weight of the polyamide resins (A) and (B) combined. If its proportion is less than 5 parts by weight per 100 parts by weight of the polyamide resins (A) and (B) combined, the strength at high temperatures and heat aging resistance of the resulting composition are only insufficiently improved. If it is above 85 parts by weight, the mechanical strength and appearance of articles molded from the resulting composition are undesirably degraded.

A further component of the composition of this invention is glass fibers (D).

The proportion of the glass fibers (D) is 5 to 300 parts by weight, preferably 10 to 250 parts by weight, per 100 parts by weight of the polyamide resins (A) and (B) combined. If the proportion of the glass fibers (D) is less than 5 parts by weight on the above basis, the effect of this component to improve the mechanical strength and thermal properties of the resulting composition is not sufficient, and if it exceeds 300 parts by weight, the moldability, warping property and surface smoothness of the resulting composition are undesirably degraded.

The polyamide resin composition of this invention may be prepared as pellets by melt-kneading components (A), (B), (C) and (D) in an extruder at a tremperature higher by 5 to 50 C than the melting point of the polyamide resins.

The composition of this invention may contain one or more of additives usually employed, for example, stabilizers against oxidation, heat and ultraviolet light, nucleating agents, plasticizers, mold releasing agents, flame retardants, antistatic agents and slip agents. As required, inorganic fillers such as calcium carbonate, talc and wollastonite, whiskers of potassium titanate or silicon carbide, carbon fibers, and alumina-silica ceramic fibers may be incorporated in the polyamide resin composition in amounts which do not impair the objects of this invention.

The polyamide resin composition of this invention has excellent strength at high temperatures and heat-aging resistance, and is useful as automobile engine covers, silencers, connectors, and in other applications requiring heat resistance.

The following Examples and Comparative Examples illusrate the present invention more specifically.

The mechanical properties in these examples ere tested by the following methods.

Tensile strength: ASTM D638
Tensile elongation: ASTM D638
Tensile modulus: ASTM D638
Flexural strength: ASTM D790
Flexural modulus: ASTM D790

EXAMPLE 1

Forty parts by weight of pellets of poly(mxylylene adipamide), nylon MXD6 hereinafter, produced by Mitsubishi Gas Chemical Co., Inc. (having a relative viscosity, measured at 25° C. for a soluton of 1 g of the polymer in 100 ml of 98 % sulfuric acid, of 2.10), 10 parts by weight of pellets of nylon 66 having a relative viscosiy of 2.25, 20 parts by weight of granular phenolic resin (Bell Pearl R-800, a registered trademark for a product of Kanebo Co., Ltd.; primary particle diameter 1 to 20 micrometers), and 30 parts by weight of glass fiber chopped strands with a length of 3 mm were mixed in a tumbler, and the mixture was melt-kneaded at 280° C. in a vent-type extruder, and extruded in string form. The extrudate was cooled over a water bath, cut, and dried to form a molding material as pellets. The material was then injection-molded at a mold temperature of 130° C. to obtain a molded product.

The results of the heat-aging test of the molded proudct are shown in Table 1, and the results of test of its strength at high temperatures are shown in Table 2.

EXAMPLE 2

A molding material as pellets was produced in the same way as in Example 1 except that 26 parts by weight of nylon MXD6, 10 parts of nylon 66, 14 parts by weight of granular phenolic resin and 50 parts by weight of glass fiber chopped strands were used as the starting mateirals.

The resulting molding material was molded as in Example 1. The results of the heat aging resistance test of the molded product are shown in Table 1, and the results of its strength test at high temperatures, in Table 2.

COMPARATIVE EXAMPLE 1

A molding material as pellets was obtained as in Example 1 except that the granular phenolic resin was not incorporated. The molding material was molded as in are shown in Tables 1 and 2.

COMPARATIVE EXAMPLE 2

A molding material as pellets was obtained in the same way as in Example 2 except that the granular phenolic resin was not incorporated, and the proportions of the other components were changed as indicated in Table 1.

The molding material was molded as in Example 1 to obtain a molded product.

The results of evaluation of the molded product are shown in Tables 1 and 2.

COMPARATIVE EXAMPLE 3

Forty parts by weight of pellets of nylon 6 (relaive viscosity 2.30), 20 parts by weight of the same granulr phenolic resin as used in Example 1, 30 parts by weight of glass fiber chopped strands having a length of 3 mm were mixed in a tumbler. The mixture was melt-kneaded in a vent-type extruder at 260° C., and extruded in string form. The extrudate was cooled over a water bath, cut and dried to produce a molding material as pellets.

The molding material was then injection-molded at a mold temperature of 80° C. to obtain a molded product.

The results of evaluation of the molded product are shown in Tables 1 and 2.

TABLE 1

| | | Example | | comparative Example | | |
|---|---|---|---|---|---|---|
| Run | | 1 | 2 | 1 | 2 | 3 |
| Amounts of components (wt. parts) | Nylon-MXD6 | 40 | 26 | 40 | 26 | — |
| | Nylon-66 | 10 | 10 | 10 | 10 | — |
| | Nylon 6 | — | — | — | — | 50 |
| | Phenolic resin | 20 | 14 | — | — | 20 |
| | Chopped glass strands | 30 | 50 | 30 | 50 | 30 |
| Tensile properties at 23° C. | | | | | | |
| Tensile strength (kg/cm$^2$) | | 1710 | 2000 | 1900 | 2650 | 1690 |
| Tensile elongation (%) | | 1.3 | 1.1 | 1.8 | 2.0 | 2.5 |
| Tensile modulus (10$^3$ kg/cm$^2$) | | 135 | 190 | 130 | 180 | 95 |
| Percent retention after aging at 180° C. (*1) | 96 hr | Tensile strength | 98 | 104 | 83 | 88 | 95 |
| | | Tensile elongation | 94 | 104 | 94 | 98 | 106 |
| | | Tensile modulus | 105 | 104 | 98 | 100 | 101 |
| | 312 hr | Tensile strength | 88 | 92 | 67 | 72 | 89 |
| | | Tensile elongation | 90 | 85 | 75 | 76 | 81 |
| | | Tensile modulus | 102 | 104 | 106 | 108 | 102 |
| | 576 hr | Tensile strength | 80 | 90 | 66 | 70 | 83 |
| | | Tensile elongation | 79 | 82 | 69 | 70 | 65 |
| | | Tensile modulus | 102 | 104 | 106 | 108 | 103 |
| | 888 hr | Tensile strength | 78 | 87 | 62 | 65 | 77 |
| | | Tensile elongation | 76 | 79 | 60 | 61 | 60 |
| | | Tensile modulus | 102 | 104 | 106 | 108 | 103 |
| | 1152 hr | Tensile strength | 76 | 81 | 51 | 54 | 71 |
| | | Tensile elongation | 74 | 75 | 52 | 51 | 53 |
| | | Tensile modulus | 102 | 104 | 106 | 108 | 103 |

(*) The percent retention after aging at 180° C. for each of the times indicated based on the results obtained by the tensile test at 23° C.

TABLE 2

| | | Example | | comparative Example | | |
|---|---|---|---|---|---|---|
| Run | | 1 | 2 | 1 | 2 | 3 |
| Bending test at 23° C. | | | | | | |
| Flexural strength (kg/cm$^2$) | | 2320 | 3000 | 2600 | 3500 | 2460 |
| Flexural modulers (10$^3$ kg/cm$^2$) | | 126 | 180 | 100 | 160 | 84 |
| Percent retention of hot flexural strength (*2) | 50° C. | Flexural strength | 100 | 99 | 100 | 94 | 75 |
| | | Flexural modulus | 98 | 96 | 98 | 96 | 78 |
| | 80° C. | Flexural strength | 94 | 81 | 79 | 78 | 44 |
| | | Flexural modulus | 69 | 68 | 62 | 75 | 50 |
| | 100° C. | Flexural strength | 72 | 61 | 62 | 52 | 36 |
| | | Flexural modulus | 46 | 47 | 42 | 50 | 45 |
| | 120° C. | Flexural strength | 57 | 48 | 52 | 43 | 34 |
| | | Flexural modulus | 42 | 45 | 37 | 43 | 42 |
| | 140° C. | Flexural strength | 51 | 40 | 49 | 38 | 33 |
| | | Flexural modulus | 40 | 40 | 36 | 35 | 40 |
| | 160° C. | Flexural strength | 42 | 37 | 40 | 35 | 32 |
| | | Flexural modulus | 36 | 35 | 32 | 34 | 38 |

(*2): The percent retention of the flexural strength and modulus at each of the temperatures indicated based on the results obtained at 23° C.

We claim:

1. A molding polyamide resin composition comprising
   (A) 50 to 99 parts by weight of a polyamide resin derived from xylylenediamine as a main diamine component and an alpha,omega-straight chain aliphatic dicarboxylic acid as a main dicarboxylic acid component,
   (B) 1 to 50 parts by weight of polyhexamethyleneadipamide resin,
   (C) 5 to 85 parts by weight, per 100 parts by weight of components (A) and (B) combined, of a thermosetting resin powder having an average particle diameter of 1 to 800 micrometers, and
   (D) 5 to 200 parts by weight, per 100 parts by weight of components (A) and (B) combined, of glass fibers,
   the total amount of the polyamide resin components (A) and (B) being 100 parts by weight.

2. The composition of claim 1 in which the polyamide resin (A) is derived from a xylylenediamine and an alpha,omega-sraight chain aliphatic dicarboxylic acid.

3. The composition of claim 2 in which the xylylenediamine is m-xylylenediamine or a mixture of p-and m-xylylenediamines containing not more than 40 % of p-xylylenediamine, and the alpha,omega-straight aliphatic dicarboxylic acid has 6 to 18 carbon atoms.

4. The composition of claim 1 in which the thermosetting resin powder (C) is a powder of a resin selected from phenolic resins, xylene resins, melamine resins and epoxy resins.

5. The composition of claim 1 in which the thermosetting resin powder (C) has an average particle diameter of 1 to 100 micrometers.

6. The composition of claim 1 in which the amount of the polyamide resin (A) is 70 to 95 parts by weight.

7. The composition of claim 1 in which the amount of the thermosetting resin powder (C) is 10 to 50 parts by weight per 100 parts by weight of the polyamide resin (A) and the poly(hexamethylene adipamide) resin (B) combined.

8. The composition of claim 1 in which the amount of the glass fibers (D) is 10 to 50 parts by weight per 100 parts by weight of the polyamide resin (A) and the poly(hexamethylene adipamide) resin (B) combined.

* * * * *